United States Patent
Voedisch

[11] 3,847,805
[45] Nov. 12, 1974

[54] ION EXCHANGE VESSEL
[75] Inventor: Richard K. Voedisch, Rockford, Ill.
[73] Assignee: Illinois Water Treatment Company, Rockford, Ill.
[22] Filed: Dec. 7, 1972
[21] Appl. No.: 313,145

[52] U.S. Cl.................. 210/33, 210/189, 210/279, 210/291
[51] Int. Cl............................................ B01d 15/04
[58] Field of Search....... 210/24, 33, 189, 263, 268, 210/269, 270, 291

[56] References Cited
UNITED STATES PATENTS

| | | | |
|---|---|---|---|
| 3,515,277 | 6/1970 | Kingsbury et al. | 210/189 |
| 3,130,151 | 4/1964 | Levendusky | 210/33 |
| 3,549,526 | 12/1970 | Brown | 210/189 |
| 3,276,585 | 10/1966 | Kalinske | 210/279 |

Primary Examiner—Frank A. Spear, Jr.
Assistant Examiner—Ivars Cintins
Attorney, Agent, or Firm—George R. Clark; Neil M. Rose; John S. Pacocha

[57] ABSTRACT

An ion exchange vessel which may be used as a condensate polisher for high pressure steam generating systems is disclosed. The vessel contains a mixed cation and anion ion exchange resin bed and it has a central collector and upper and lower distributors which increase the service flow rate through the ion exchanger. The distribution holes in the laterals and the weep holes in the central hub of the lower distributor are not screened, and resin is removed from the vessel through the unscreened distribution and weep holes. A screened off-center drain is provided to facilitate the draining of liquid from the vessel without the loss of resin.

5 Claims, 2 Drawing Figures

PATENTED NOV 12 1974    3,847,805

ION EXCHANGE VESSEL

BACKGROUND OF THE INVENTION

The high pressure steam generating systems that are in use in modern power plants require a high degree of deionization and filtration of the return condensate in order to prevent costly shut down of the boiler for the system. The main functions of a condensate polisher is to protect against condenser leaks in the system and to remove precipitated metal oxides in the return condensate from the boiler. During normal operation the mineral content of the return condensate is quite low and requires little deionization. However, if a condenser leak occurs and raw water is blended in with the condensate the mineral content of the condensate rises sharply. The condensate polisher must have a sufficient demineralizing capacity to prevent boiler shut down when condenser leaks occur.

In addition to the demineralizing or deionizing function of the condensate polisher, it must also remove the precipitated metal oxide or "crud" which appears in the condensate. The demineralizing feature of the condensate polisher is employed to any substantial extent only when an occasional leak occurs and the cooling water for the condensers, which has a high mineral content, mixes with the condensed steam being returned from the turbine generators. The condensate polisher must continually operate, however, as a filter for removing corrosion products from the power generating system which would otherwise contaminate the condensate and thus necessitate more frequent boiler shutdowns for cleanup.

When a boiler is initially put into operation the amount of crud which is contained in the condensate accumulates at a rapid rate as a result of cleaning of the boiler. This crud is filtered out in the condensate polisher but a high pressure drop will occur long before the ion exchange capacity of the ion exchange resin has been exhausted. In order to conserve time and to reduce operating costs a short clean-up cycle may be used to remove the crud from the ion exchange resin so that it can be returned to service without complete regeneration.

Conventional mixed bed condensate polishers are operated at service flow rates of approximately 50 gallons per minute per square foot of resin. With this flow rate optimum utilization of the ion exchange is obtained and the bed, which consists of resilient, compressible resin beads, will be compressed sufficiently to provide good filtration for the contaminating crud.

In a conventional condensate polisher, the service flow enters at the top of the polisher and flows down through the resin, out of a collector which is positioned near the bottom of the polisher and then back to the boiler as filtered condensate. The service flow rate that is employed in such conventional polishers is limited due to the high pressure drop which occurs in the resin.

U.S. Pat. No. 1,942,807 to A. J. Dotterweich discloses a water softening apparatus in which multiple service flow paths are provided through a zeolite bed to increase the service flow rate through the water softener. The water softener disclosed in the Dotterweich patent is suitable for removing calcium and magnesium from water and for replacing it with sodium. The sand-like zeolite used in the Dotterweich water softener, however, could not be used since that material is silicious and would contaminate the condensate. In addition, relatively low pressure drops and flow rates would have to be employed with the Dotterweich softener. Moreover, zeolite does not remove substantially all of the unwanted anions and cations from the treated water, as is desirable, since it merely replaces the "hard" cations of calcium and magnesium with the "soft" cation of sodium.

The water softener of the Dotterweich patent was regenerated in place. There are good reasons for remotely regenerating the resin used in a condensate polisher rather than regenerating the resin in place in the ion exchanger. They are: (1) the cost of providing the large piping and valve systems that are required with suitable corrosion resistant materials to prevent corrosion by the regenerant chemicals is excessive; (2) the internal distribution systems which are required to achieve the high flow rate that is necessary to obtain proper compression of the resin so that it will act as a filter are much too large for the proper regeneration of the resin; and (3) remote regeneration lessens the possibility of contaminating the condensate.

Conventional lower distributors of ion exchangers used as condensate polishers consist of a hollow centrally located hub at the bottom of the ion exchange vessel, which has a number of holes, called weep holes, which extend radially around the bottom portion of the hub near the point at which it enters the ion exchange vessel. Conventional lower distributors also consist of a number of outwardly extending pipes, or laterals, which have a multitude of holes drilled in them to allow for the passage of liquid from the central hub out through the laterals. The laterals become shorter in length as they approach the bottom of the tank in order to conform to the curvature of the tank. At the very bottom of the tank it is impractical to provide the very short laterals need to conform to the shape of the tank. The screened weep holes are, therefore, provided in the central hub of the condensate polisher to remove liquid from the lowermost portion of the vessel without the removal of resin. Condensate polishers are generally operated with a downward service flow and thus the use of screens over the holes in the laterals of the lower distribution and over the weep holes in the central hub are needed to prevent the loss of resin when liquid is extracted from the vessel through the lower distributor.

In the conventional condensate polishing ion exchanger described above, resin is sluiced out of the tank to a remote regeneration through a drain which is located on the bottom wall from the bottom of the vessel. Since the hub is located in the center of the ion exchange vessel, the drain must be located off-center. The off-center location of the drain makes it impossible to remove all of the resin from the ion exchange vessel because a portion of the ion exchange vessel will of necessity lie below the drain. Although relatively complete removal can be obtained with an off-center located drain, it requires the use of a large amount of sluice water and the addition of resin collector rings or water jets.

During start-up of a condensate polisher the "crud" or suspended solid load is very high. In many condensate polishers, the service flow is downward through the bottom distributor and the most of the crud is filtered out by the resin before it reaches the screens over the laterals and the weep holes. In the condensate polisher of FIG. 2, however, the flow is divided with the upper distributor providing downward service flow and the bottom distributor providing upward service flow so that the output is taken from the intermediate collector. The distribution and weep holes of the lower distributor of the present invention are unscreened; so that fouling of the screens does not occur. With screens over these holes, fouling would be a constant problem because the crud would reach these screens before filtration by the resin bed, as occurs in the case of downward service flow to the lower distributor.

Because the flow rate from the bottom distributor is upward, and at a high rate, the removal of the screens over the laterals and the weep holes of the lower distributor does not result in a loss of resin. In addition, if it is desired to remove resin from the ion exchanger vessel, flow through the lower distributor may be reversed and resin is then removed directly through the unscreened laterals and weep holes. With the location of the weep hole at the lowermost portion of the vessel and at the center of the vessel, virtually all of the resin in the ion exchange vessel will be transferred from the vessel without the added expense of employing internal resin collector rings and excessive sluice water. The off-center drain on the bottom of the vessel of the present invention is screened, unlike conventional resin drains, and the draining of the liquid from the tank through this drain may be achieved without the loss of resin.

It is, therefore, an object of the present invention to provide for improved condensate polishing by means of an ion exchange vessel, whereby substantially all of the resin of the vessel may be removed from the vessel in a simple and efficient manner.

It is an additional object of the present invention to provide a lower distributor for an ion exchanger in which one of the service flow paths through the ion exchanger is upward from the lower distributor, wherein resin may be removed through unscreened holes of the lower distributor by providing a downward flow of sluice liquid through the ion exchanger during resin removal.

It is another object of the present invention to provide for the modification of conventional ion exchange vessels having a centrally located lower distributor with a plurality of screened apertures and a non-centrally located unscreened drain wherein an improved vessel is provided by removing the screens across the apertures of the lower distributor, by adding a screen across the non-centrally located drain and by modifying the valve and control system such that resin may be removed through the apertures of the lower distributor and liquid may be removed from the vessel through the screened drain without resin loss.

Other objects and advantages of the present invention will be apparent to those skilled in the art from the following technical description of the invention.

DESCRIPTION OF A SPECIFIC EMBODIMENT OF THE INVENTION

Figure 1:
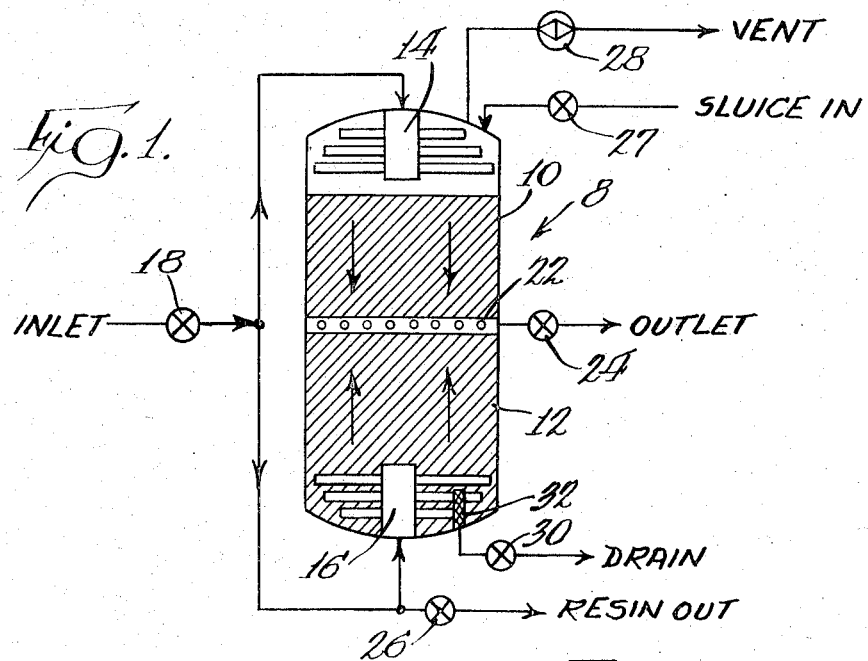
FIG. 1 is a schematic cross-sectional illustration that shows a condensate polishing ion exchange vessel utilizing the present invention.

In FIG. 1, an ion exchange vessel which is suitable for employment as a condensate polisher is indicated generally by the reference numeral 10. The condensate polishing vessel 10 contains a mixed bed of cation and anion exchange resins. The cation resin for the mixed bed condensate polishing vessel 10 is preferably a sulfonic cation exchange resin and the anion resin is preferably a quaternary ammonium strong base anion exchange resin. Suitable cation exchange resins include Dow Chemical Company HCRW resin, Rohm and Haas IR-120 resin and Diamond Shamrock C-20 resin. Suitable anion exchange resins include Dow Chemical Company SBR resin, Rohm and Haas IRA-400 resin and Diamond Shamrock Company A-101D resin.

Suitable condensate polishing systems, which may employ the ion exchange vessel of the present invention, are described in the co-pending application, Ser. No. 238,211, which is assigned to the assignee of the present invention.

In the embodiment illustrated in FIG. 1, the condensate to be treated is returned from the associated steam generating system and is supplied to the upper distributor 14 and the lower distributor 16 through the open inlet valve 18. The service flow from the upper distributor 14 is downward through the mixed resin bed 12, and from the lower distributor 16, it is upward through the mixed resin bed 12. The collector 22 is located in the mixed resin bed 12 intermediate the distributors 14 and 16. The intermediate collector 22 collects the downward and upward service flows from the upper and lower distributors 14 and 16, respectively, and returns the treated water to the power generating system through the valve 24 when it is of sufficient purity to be used by the boiler of the power generating system. The valves 26, 27, 30 and the vent valve 28 are closed during service flow. The valves and the valve controls that are used in the system of the present invention can consist of suitable conventional components that are utilized in a manner familiar to those skilled in the art.

Condensate supplied from the power generating system to the condensate polishing vessel 10 contains crud or suspended precipitated oxide material which must not enter the boiler of the power generating system. As previously mentioned, the flow of the influent through the distributors 14 and 16 to the collector 22 is split approximately equally through the resin bed 12. To equalize the service flow rate the pressure drop through the upper and lower portions of the piping system and the treatment media that is contained in the vessel is taken into consideration. The flow through the mixed resin bed 12 in the vessel 10 preferably is at a rate of 25 to 100 gallons per minute per square foot of resin which gives a pressure drop of approximately 35-50 pounds per square inch. At this flow rate the mixed resin bed 12 which consists of resilient compressible resin beads is sufficiently compacted to provide proper filtration for removing the suspending crud in the condensate.

If a condenser leak has occurred and high mineral containing cooling water is mixed with the condensate the ion exchange capacity of the mixed resin bed 12 may become depleted. When this occurs the resin in the vessel 10 is transferred hydraulically to a separate vessel or group of vessels for regeneration (not shown).

In order to transfer the resin from the vessel 10 to the regenerating station, the valves 26 and 27 and the vent valve 28 are opened. The valves 18, 24 and 30 are closed at this time. Sluice water is supplied through the valve 27 at the top of the vessel 10. The resin in the vessel 10 will be sluiced out through the valve 26 due to the sluice water flowing downwardly through the tank from the valve 28. The resin in the vessel 10 is thus transferred to a remote regenerating and cleaning station where regeneration and/or cleaning of the mixed resin bed is accomplished.

In the event that the ion exchange capacity of the mixed resin bed 12 is not exhausted but is merely plugged with crud, the resin bed 12 may be restored to usefullness at the regeneration and cleaning station by scrubbing the resin with air to loosen up the crud and then by backwashing the resin. On the other hand, if most of the ion exchange capacity of the mixed resin bed 12 is exhausted a complete regeneration of the resin bed 12 will be required. Complete regeneration includes both the crud removal sequence and the regeneration step described above. A dilute strong acid, such as a 4 to 10 percent concentration of sulphuric acid, may be used for regenerating the cation resin and a dilute strong alkaline such as a 4 to 10 percent of sodium hydroxide is preferred for regenerating this anion resin. Both the cation and the anion resins from the vessel 10 may be treated with ammonia or other chemicals, if desired, to obtain better cleanup and regeneration, or to place the resins in a more desirable ionic form.

After the cation and anion resins have been regenerated, or at least physically restored by air scrubbing, to an operating condition, the anion and cation resins are remixed by means of air and water. They are then transferred either to a storage vessel (not shown) until they are needed, or they are transferred back to the vessel 10 through the valve 27, with all of the other valves being closed except drain valve 30. Water is not allowed to accumulate in the vessel 10 during recharging of the polisher with resin since this would cause the lower density anion resin to separate from the cation resin. Prior to receipt of the regenerated resin from the regenerating and cleaning station, the vessel 10 will have been drained completely through the drain pipe 32 by opening the vent valve 28 and the drain valve 30. The apertured drain pipe 32 has a screen around it to prevent resin loss when the tank is being drained. The valves 18, 24 and 27 are closed at this time.

When the complete charge of resin has been transferred into the vessel 10, the valve 30 is closed but water will still continue to flow through the valve 27 until the vessel 10 is filled. When the vessel 10 is filled the condensate polisher is ready for operation. During operation, the condensate continues to recirculate through the condenser hot well and the condensate polishing vessel 10 until it is sufficiently pure for use by the power generating system. When a sufficient purity for service flow is obtained, the treated condensate used by the power generating system is filtered and demineralized condensate.

Figure 2:
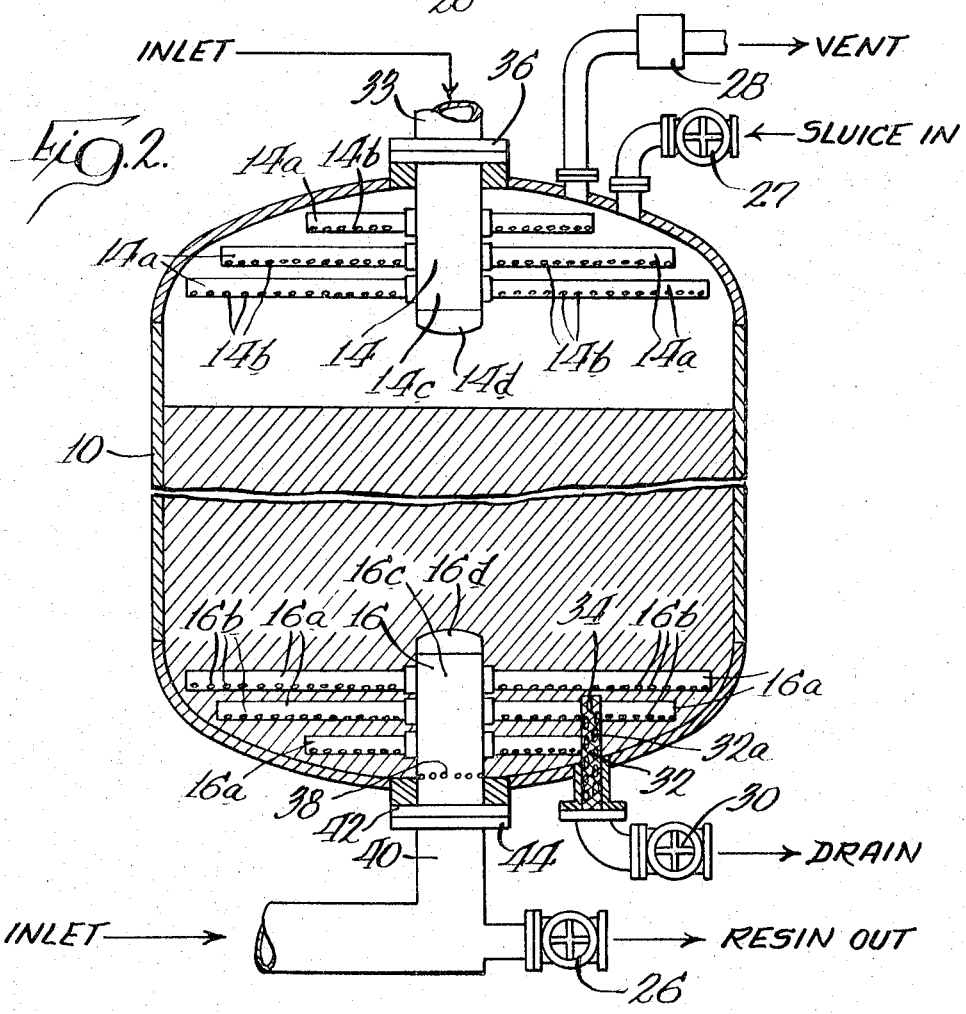
FIG. 2 is an enlarged broken cross sectional view of the ion exchange vessel of FIG. 1 that shows the upper and lower portions of the vessel of FIG. 1 in greater detail.

The construction of the improved ion exchange vessel and distribution elements of the present invention can be seen in more detail by reference to FIG. 2. The upper distributor 14 is a conventional distributor having a plurality of radially extending hollow pipes called laterals 14a. The laterals 14a are provided with a number of holes 14b therein which lead to the hollow interior of the lateral. The upper distributor 14 has a hollow centrally-located hub 14c which is closed at its lower end by the cap 14d. The hub 14c is in communication with the interior of the laterals 14a so that flow can occur through the hub 14c and the holes 14b in the laterals 14a. The flange 36 of the upper inlet pipe 33 is coupled to the flange 38 of the vessel 10 by suitable coupling means to secure the pipe 33 to the vessel 10.

The construction of the lower distributor 16 is substantially similar to that of the upper distributor. The lower distributor 16 correspondingly has a plurality of radial extending laterals 16a, each of which are provided with a number of apertures 16b therein. The lower distributor 16 has a centrally located hub 16c which is closed at its upper end by the cap 16d. The hub 16c is in communication with the hollow laterals 16a so that flow can occur through the central hub 16c and out through the holes 16b in the laterals 16a. In addition, the lower portion of the hub 16c is provided with a circular ring of holes 38, called weep holes. The weep holes 38 extended just above the lowermost portion of the ion exchange vessel 10. The flange 44 of the lower input pipe 40, which supplies the lower distributor 16, is coupled to the flange 42 of the vessel 10 by suitable conventional coupling means to secure the pipe 40 to the vessel 10.

If the lateral holes 16a and the weep holes 38 of the lower distributor 16 were screened or filtered, it would be necessary to flush these screens or filters often to prevent plugging or fouling due to the excessive crud that accumulates during start-up. The term "screen," as used herein, is intended to signify conventional screens or any other equivalent form of a filter. By removing the screens that are provided for the lateral holes 16b and the weep holes 38, the plugging problem has been eliminated in the vessel of the present invention. For removal of the resin from the vessel 10, it is necessary to draw out the resin through an unscreened drain. In the conventional ion exchanger or condensate polisher, this is achieved by sluicing of the resin through a drain pipe which is located on the bottom of the vessel, but not at the central portion of the vessel. In the present invention, the resin is drawn out through the unscreened apertures 16b in the laterals 16a and through the weep holes 38. Since the weep holes are centrally located at the lowest point on the vessel 10, this method of removal of resin is advantageous in that substantially all of the ion exchange resin that is present is removed from the vessel 10. In addition to more complete removal of the ion exchange resin from the vessel 10 without the use of devices such as resin collector rings or water jets, the amount of sluice water that is required is substantially reduced.

It is still necessary, however, to be able to drain liquid from the vessel 10 at various times without removal of ion exchange resin from the vessel. In the ion exchanger or condensate polisher of the present invention, this is achieved by providing a screen 34 across the drain pipe 32 so that liquid may be drawn out through the apertures 32a in the pipe 32 while the resin of the mixed bed 12 will remain in the vessel 10. The present invention, therefore, achieves more complete resin removal than previous systems with considerably less sluice water. By more complete removal and regeneration or cleaning of substantially all of the resin in the vessel 10, the effective capacity of the ion exchanger is increased. Currently existing ion exchange condensate polishing vessels of the type described may be easily modified to incorporate the present invention merely by removing the screens from the lateral holes and the weep holes of the lower distributor, by adding a screen across the drain pipe 32 and by implementing the valving and control sequence that is required to sluice out resin through the lower distributor, rather than through the drain, and to drain off liquid through the drain, rather than resin.

Although a particular embodiment of the present invention has been described, it is not intended that the present invention be limited to the particular embodiment illustrated herein since variations and modifications thereof will be apparent within the scope of the present invention to those skilled in the art. It is, therefore, intended that the scope of the present invention be limited only by the claims appended hereto.

What is claimed is:

1. An ion exchange vessel containing ion exchange resin comprising a distribution means, liquid supply means connected to said distribution means for providing upward service flow, a collection means positioned above said distribution means, liquid supply means connected to said collection means for selectively providing downward liquid flow, said distribution means comprising unscreened apertured distribution means for both supplying said upward service flow and for removing resin from said vessel when said downward liquid flow is being selectively provided through said vessel and draining means comprising a screened lower drain for selectively draining liquid from said vessel without the removal of any substantial amount of resin from said vessel, said distribution means comprises a hollow hub which protrudes upwardly through the center of the bottom of said vessel and a plurality of hollow radially extending unscreened apertured laterals which are in fluid communication with said hub, said hub having a plurality of unscreened holes therein which extend circumferentially around said hub adjacent the area where said hub protrudes through the bottom of said vessel.

2. The ion exchange vessel of claim 1 comprising a second distribution means positioned above said collection means to provide downward service flow concurrently with said upward service flow.

3. The ion exchange vessel of claim 1 where said drain comprises a screened apertured drain pipe which protrudes through the bottom of said vessel in an area removed from the center of the bottom of said vessel.

4. The ion exchange vessel of claim 3 comprising a second distribution means positioned above said collection means, liquid supply means connected to said second distribution means to provide downward service flow concurrently with said upward service flow.

5. A method of operating an ion exchange vessel containing ion exchange resin and having a distribution means and a collection means positioned above said distribution means for providing an upward service flow through said vessel, said vessel having a drain adjacent to said distribution means, comprising the steps of maintaining a service flow of liquid in said ion exchange vessel upwardly from said distribution means to said collection means and concurrently maintaining a service flow downwardly to said collection means through the upper portion of said vessel, terminating the upward service flow through said distribution means and the downward service flow to said collection means, after terminating said upward service flow and said downward service flow supplying sluice water downwardly through said vessel and removing resin from said vessel through said distribution means during the downward flow of sluice water through said vessel, selectively draining liquid from said vessel without the removal of resin from the tank.

* * * * *